United States Patent [19]
Ih et al.

[11] Patent Number: 4,726,011
[45] Date of Patent: Feb. 16, 1988

[54] COHERENT OPTICAL FIBER COMMUNICATION WITH FREQUENCY-DIVISION-MULTIPLEXING

[75] Inventors: Charles C. Ih, Newark, Del.; Charles K. Kao, Trumbull, Conn.

[73] Assignee: ITT Defense Communications, a division of ITT Corporation, Nutley, N.J.

[21] Appl. No.: 720,658

[22] Filed: Apr. 8, 1985

[51] Int. Cl.⁴ ............................................. H04B 9/00
[52] U.S. Cl. ......................................... 370/3; 455/617; 455/619
[58] Field of Search ............. 455/619, 617; 370/1, 370/2, 3, 120; 350/358, 96.11, 96.12; 333/126, 129, 134

[56] References Cited

U.S. PATENT DOCUMENTS

| | | | |
|---|---|---|---|
| 1,361,488 | 12/1920 | Osborne | 370/120 |
| 3,121,847 | 2/1964 | Pakan | 333/134 |
| 3,258,597 | 6/1966 | Forrester | 455/619 |
| 3,676,684 | 7/1972 | De Lange | 370/3 |
| 3,908,121 | 9/1975 | Riseberg et al. | 370/1 |
| 3,975,628 | 8/1976 | Graves et al. | 455/619 |
| 4,206,347 | 6/1980 | Avicola et al. | 350/358 |
| 4,318,058 | 3/1982 | Mito et al. | 350/96.11 |
| 4,468,766 | 8/1984 | Spezio | 455/619 |
| 4,503,403 | 3/1985 | Taylor et al. | 455/619 |
| 4,635,246 | 1/1987 | Taylor et al. | 455/619 |

FOREIGN PATENT DOCUMENTS

| | | | |
|---|---|---|---|
| 56-149837 | 11/1981 | Japan | 370/3 |
| 56-149838 | 11/1981 | Japan | 370/3 |
| 58-206245 | 12/1983 | Japan | 370/3 |
| 2131567 | 6/1984 | United Kingdom | 350/96.11 |
| 2142796 | 1/1985 | United Kingdom | 370/3 |

OTHER PUBLICATIONS

Faure et al—"Progress Towards Heterodyne"—IEEE Jour. of Quantum Elect., vol. QE-17, No. 6, Jun. 1981, pp. 897–905.

Izutsu—"Integrated Optical SSB"—IEEE Jour. of Quantum Elect., vol. QE-17, No. 11, Nov. 1981—pp. 2225–2227.

Primary Examiner—Joseph A. Orsino, Jr.
Attorney, Agent, or Firm—Robert A. Walsh; Thomas N. Twomey; Mary C. Werner

[57] ABSTRACT

The method and associated system for providing increased information carrying capacity in optical fiber communication through frequency-division-multiplexing, comprising the steps of generating a reference optical beam, generating a plurality of closely spaced optical carriers having frequencies which are coherently related to the reference frequency of the reference optical beam and which are capable of drifting with the reference frequency while maintaining coherence therewith, and combining the plurality of closely spaced optical carriers to provide a multiplexed optical output beam. Advantageously, a frequency tracking optical beam tracks the reference optical beam and the plurality of closely spaced optical carriers of the multiplexed optical output beam are optically heterodyne detected by the tracking optical beam to convert the plurality of closely spaced optical carriers into a microwave spectrum, so that the individual carrier frequencies present in the microwave spectrum which correspond to the frequencies of the plurality of closely spaced optical carriers may be electronically heterodyne detected and separated from the microwave spectrum.

20 Claims, 5 Drawing Figures

COHERENT OPTICAL FIBER COMMUNICATION WITH FREQUENCY-DIVISION-MULTIPLEXING

BACKGROUND OF THE INVENTION

The present invention relates to coherent fiber optical communication, and more specifically to coherent fiber optical communication with frequency-division-multiplexing.

Present systems for coherent optical fiber communication have only limited information bandwidth and may suffer serious non-linear distortions. Digital transmission is currently the dominant mode for fiber optical communication. In order to utilize the large available information bandwidth, the current practice is to use higher and higher bit rates. However, for operation near the maximum repeater span, there appears to be a fundamental limit as to how fast or how short a pulse can be transmitted without causing Stimulated-Brillouin Scattering (SBS) and other non-linear phenomena.

Conventional frequency-division-multiplexing (FDM) used in optical fiber communication (OFC) employs an incoherent optical source which is directly intensity modulated by a multiplexed RF signal. Direct detection is used to recover the RF signals. These RF signals up to several hundred MHz are demodulated by standard RF techniques. This system has been widely used for multiple video channel transmission, normally over short distances up to 10 Km. However, due to serious intermodulations, this system is normally implemented using FM modulated RF channels. Since the intensity of the optical source (laser diode) is directly modulated by the multiplexed RF signals, the total information bandwidth is limited by the frequency response of the laser diode. Presently, the modulation limit is on the order of several GHz.

Until recently substantially all OFC systems were incoherent. A coherent heterodyne system using a single or multiple optical carriers has been suggested. Basically this system employs a single frequency laser as the transmitter, a single mode fiber as the transmission medium and a local oscillator as the receiver. For such a system a very stable semi-conductor laser and optical fibers with stable polarization characteristics are required. When only a single carrier is employed, absolute frequency stability is not critical as long as the carrier can be tracked by the local oscillator. Initially, the local oscillator is tuned near the transmitter frequency by changing its temperature and injection current. The frequency of the local oscillator is then AFC controlled to track the transmitter. If many carriers are used the frequency stability of the carriers must be greatly improved. Moreover, it is difficult to achieve narrowly spaced carriers of the required stability. Currently, such a system requires a minimum carrier separation of between 10 and 100 gigahertz.

British patent application Ser. No. 8312649, filed May 7, 1983, in the name of Robert W. A. Scarr, entitled, Optical Packet Switching System, discloses a packet switch in which the data to be conveyed is modulated onto an optical beam using an electro-optic, acousto-optic or magneto-optic device, and in which the data is switched between the trunks served by the switch by a multi-position switching device formed by an acousto-optic switch working in the Bragg regime.

SUMMARY OF THE INVENTION

It is an object of the present invention to provide an optical fiber communication system with increased information carrying capacity or bandwidth.

It is a further object of the present invention to provide an optical fiber communication system for multi-channel communication.

It is a further object of the present invention to provide an optical fiber communication system which exhibits very high Bandwidth-Distance-Product (BDP).

It is a further object of the present invention to provide an optical fiber communication system which reduces non-linear distortion.

It is a further object of the present invention to provide an optical fiber communication system in which the threshold of Stimulated-Brillouin-Scattering (SBS) is reduced so that more power can be used for transmission.

It is a further object of the present invention to provide an optical fiber communication system which can be used for simultaneous digital as well as analog information transmission.

It is a further object of the present invention to provide a coherent optical fiber communication system.

It is a further object of the present invention to provide an optical fiber communication system which can have a minimum carrier frequency separation of less than one gigahertz, as desired.

It is a further object of the present invention to provide an optical fiber communication system which can have a minimum carrier frequency separation of only a very small fraction of a nanometer, as desired.

It is a further object of the present invention to provide an optical fiber communication system which can be heterodyne detected simultaneously with a single local oscillator.

It is a further object of the present invention to provide an optical fiber communication system which can be further heterodyne detected using microwave techniques to minimize excess noise and to provide good channel separation.

It is an object of the present invention to provide an optical fiber communication system which is capable of homodyne and PSK detection.

It is a further object of the present invention to provide an optical fiber communication system in which the polarization state of the optical fiber can be optimized for all carriers.

It is a further object of the present invention to provide an optical fiber communication system which can be used in conjunction with conventional Wavelength-Division-Multiplexing (WDM) systems to further expand the available information bandwidth.

Briefly, in accordance with the present invention a method and associated system is disclosed for providing increased information carrying capacity in optical fiber communication through frequency-division-multiplexing, comprising the steps of generating a reference optical beam, generating a plurality of closely spaced optical carriers having frequencies which are coherently related to the reference frequency of the reference optical beam and which are capable of drifting with the reference frequency while maintaining coherence therewith, and combining the plurality of closely spaced optical carriers to provide a multiplexed optical output beam. Advantageously, a frequency tracking optical beam tracks the reference optical beam and the plurality of closely spaced optical carriers of the multiplexed optical output beam are optically heterodyne detected by the tracking optical beam to convert the plurality of closely spaced optical carriers into a microwave spectrum, so that the individual carrier frequencies present in the microwave spectrum which correspond to the frequencies of the plurality of closely spaced optical carriers may be electronically heterodyne detected and separated from the microwave spectrum.

Other objects, aspects and advantages of the present invention will be apparent from the detailed description considered in conjunction with the drawings, as follows:

DETAILED DESCRIPTION

Optical fiber communication using a single-mode fiber has been viewed as the preferred mode of operation since its inception in 1966. A single mode fiber can be manufactured with zero dispersion in the 1.3 to 1.6 micrometer region. Such a fiber normally has a bandwidth exceeding 1000 gigahertz-Km.

In accordance with the present invention, frequency-division-multiplexing is provided for coherent optical fiber communication in which a plurality of separated optical carriers are employed. The optical carriers are closely spaced and can be used for simultaneous digital or analog information transmission. Preferably, the range of frequency separation between the closely spaced optical carriers is from 100 MHz to 300 GHz. However, very significantly, only the relative frequency, spacing or stability (coherence) between the carriers and a reference optical beam is maintained within required tolerances. The frequency of the reference optical beam and all the carriers are allowed to drift together. The maximum permissible drift rate is such that an optical local oscillator in the receiver can track the reference wave.

The required relative stability or tolerance is dependent upon what type of modulation is used with the transmitting lasers. For ASK, the required stability should be such that the generated IF is within the IF filter bandwidth. The stability is generally a small percentage of the IF frequency. Based on todays technology, for an IF of 1 GHz, the stability may be on the order of 50 MHz, i.e., 5% or less. For FSK, additional consideration must be given to the "slope" of the discriminator. In order to obtain the maximum SNR discrimination, the two frequencies (assuming two-level transmission) should be centered as closely as possible to the discriminator, therefore a tighter tolerance is needed. For the above example, a stability of 1 to 10 MHz may be necessary. For PSK, phase-locking is necessary.

The closely spaced optical carriers can be generated in various ways. One approach is to use a reference beam from a single-mode laser diode whose frequency and therefore the frequency of the system is stabilized. The stability of the reference frequency should be consistent with that of the optical local oscillator. The frequency of the laser diode can be stabilized by using an AFC and by changing its temperature or injection current or both.

The reference laser beam, or a part of it, is frequency shifted by the desired amount. The frequency-shifted beam is used to injection-lock or frequency stabilize a transmitting laser, such as a laser diode. The transmitting laser can be modulated (externally if desired) and still maintain coherence with respect to the reference laser beam. Since only a small fraction of the output power from the reference laser is needed to injection-lock a transmitting laser, the reference laser can be used to injection-lock many transmitting lasers, each having a different frequency shift.

This frequency shift can be accomplished by sending the laser beam from the reference laser through a Traveling-Wave-Acousto-Optical-Modulator (TWAOM). The frequency of a laser beam has been shifted by as much as 13 gigahertz by using a TWAOM. Moreover, by cascading, even greater frequency shifts can be obtained.

An alternative way of generating the multiple optical carriers is to injection-lock a plurality of transmitting lasers to the sidebands of an FM modulated injection laser. When an injection laser is modulated near its resonant frequency, a large FM modulation will result. If the index of the modulation is properly adjusted, a large number of sidebands are generated. For example, if the injection laser is modulated at 2 gigahertz near its resonant frequency, the laser beam will contain the $-4$, $-2$, $0$, $+2$ and $+4$ gigahertz sidebands, with the 0th order representing the unshifted injection laser frequency. Therefore, if five transmitting lasers are selectively injection-locked to the five sidebands, the frequency of the five transmitting lasers will be 2 gigahertz apart. However, it should be clearly understood that injection-locking is only one way of generating the plurality of coherent closely spaced optical carriers, and that the present invention embraces techniques for stabilizing the frequencies between lasers without actually frequency or phase-locking the same.

Figure 1:
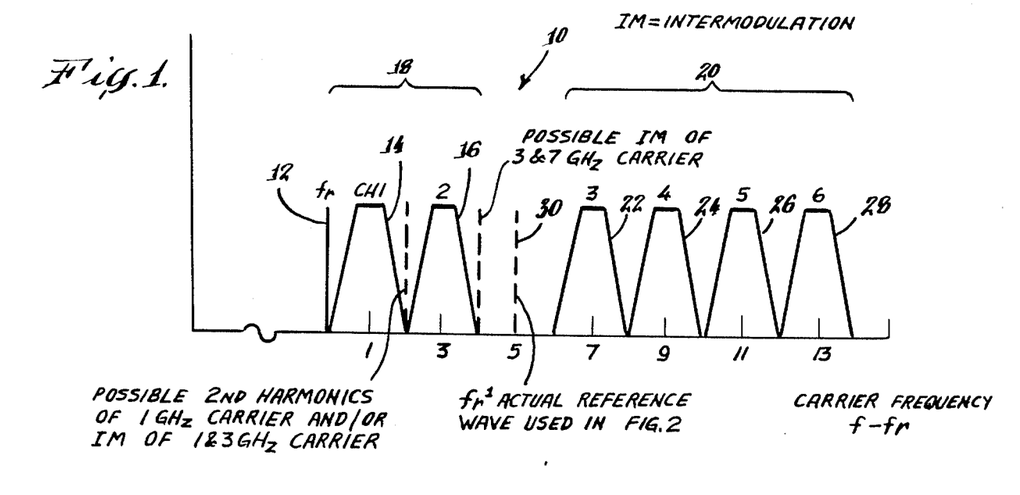
FIG. 1 is a schematic diagram illustrating one possible channel frequency assignment for the closely spaced optical carriers in accordance with the present invention.

Referring to FIG. 1, a frequency assignment for the coherent FDM optical carriers in accordance with the present invention is designated as 10. A reference frequency (fr) having some arbitrary value is indicated at 12. The specific frequency of the reference wave 12 is unimportant as long as it is reasonably stable and can be frequency tracked by an optical local oscillator. The six channels for the optical carriers are indicated as 14, 16, 22, 24, 26 and 28, with each channel being separated by 2 gigahertz. That is, each carrier is associated with a bandwidth of 2 gigahertz (minus some guarding bands).

The first optical carrier 14 has a frequency 1 gigahertz above the reference wave 12. The next optical carrier 16 has a frequency 3 gigahertz above the reference wave 12. These two optical carriers form a group or frequency band, designated as 18. Another frequency band is designated as 20. The band 20 includes four optical carriers. The first optical carrier 22 of this band 20 has a frequency 7 gigahertz above the reference wave 12. The next optical carrier 24 has a frequency 9 gigahertz above the reference frequency 12. The third optical carrier 26 has a frequency 11 gigahertz above the reference frequency 12. Finally, the last optical carrier 28 has a frequency 13 gigahertz above the reference frequency 12. Although the assignment of these frequencies is somewhat arbitrary, they have been selected to minimize harmonic distortion during heterodyne detection. Further, with the channel frequencies selected as shown in FIG. 1, all possible intermodulations and the second harmonics fall between the carriers. The actual frequency used for generating the optical carriers, such as illustrated in FIG. 1, need not be the same as the reference wave 12 illustrated in FIG. 1, but can be located between the two bands 18 and 20 at 30 as indicated by the dashed line in FIG. 1 and designated as $fr^1$.

The six optical carriers 14, 16, 22, 24, 26 and 28 represented by the six channels in FIG. 1 have a bandwidth of 12 gigahertz. The next two possible frequency bands will extend from 27 to 53 and 110 to 210 gigahertz. These two frequency bands will provide an additional 65 channels. Thus, the total number of channels for the four frequency bands is 71 with a total bandwidth of 142 gigahertz. However, each channel propagates independently and has an independent bandwidth of 2 gigahertz.

As previously mentioned, the coherent optical carriers in accordance with the present invention may be generated by optical frequency shifting or injection-locking two or more lasers. The use of a TWAOM to shift a laser beam in bulk is well known. Recently efficient acousto-optic Bragg diffraction in GaAs-GaAlAs waveguide structures has been implemented. Injection-locking of a laser to another laser beam has been widely used in many optical heterodyne detection systems.

Figure 2:
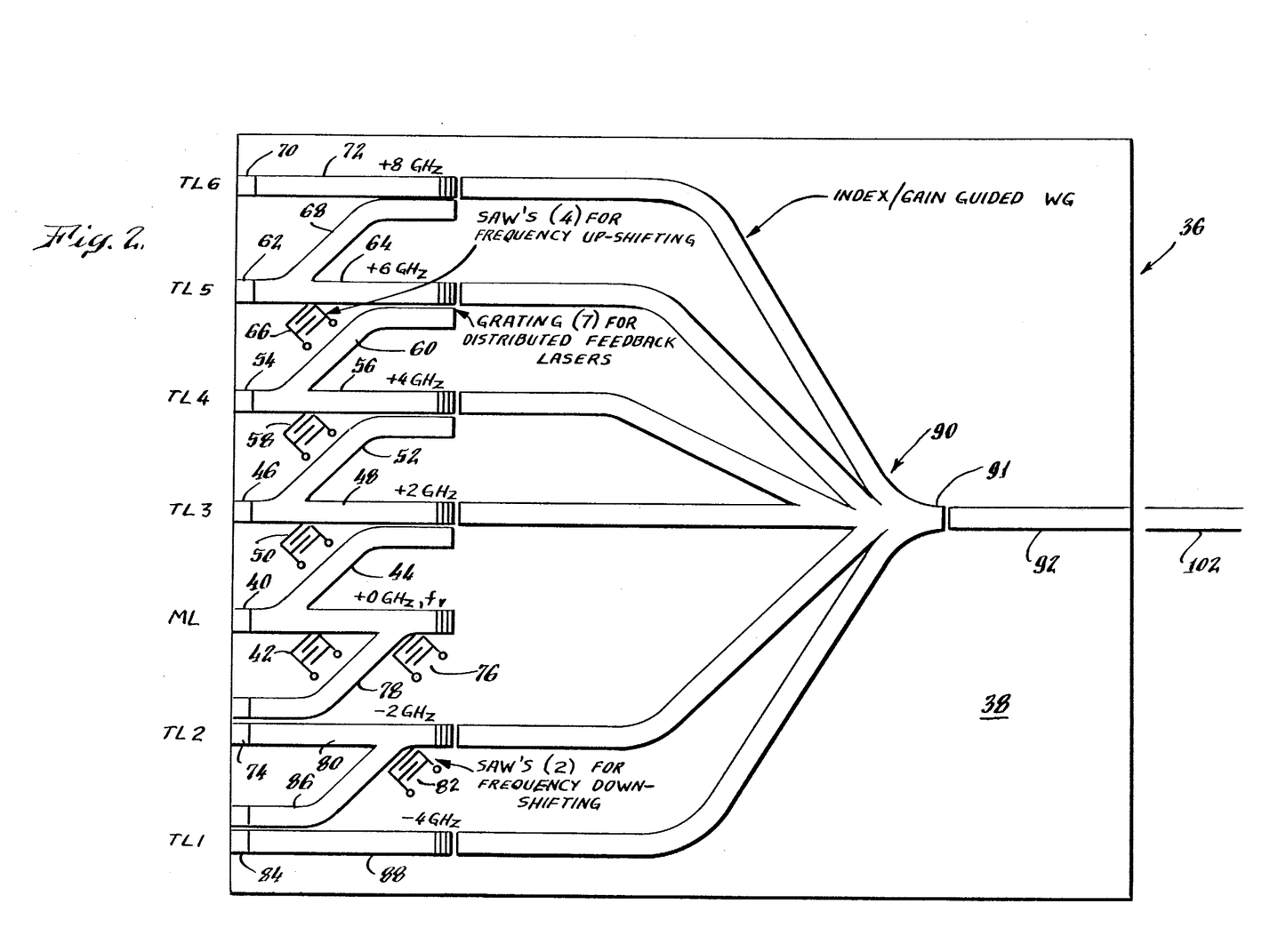
FIG. 2 is a schematic diagram for the monolithic implementation of an FDM transmitter in accordance with the present invention.

Referring to FIG. 2, a coherent FDM transmitter in accordance with the present invention is illustrated in Opto-Electronic-Integrated-Circuit (OEIC) form at 36; the components of the FDM transmitter are formed on an integrated chip or substrate 38. Implementation for the channel frequency assignments of the optical carriers 14, 16, 22, 24, 26 and 28 shown in FIG. 1 is illustrated in FIG. 2. The reference frequency ($fr^1$), designated 30 in FIG. 1, is used as the actual reference frequency in FIG. 2. This reference frequency 30, shown as 5GHz in FIG. 1, is up-shifted to produce the upper frequency band 20 and down-shifted to produce the lower frequency band 18. The reference frequency 30 is produced by a master laser (ML) oscillator 40. A portion of the beam from the master laser 40 is deflected or frequency shifted by +2 gigahertz by a Surface-Acoustic-Wave transducer (SAW) 42 and is then directed by a curved waveguide 44 to a third transmitting laser 46 (TL3) which is positioned above the master laser 40 in FIG. 2. The third transmitting laser 46 is injection-locked to the frequency up-shifted optical beam due to the coupling between the curved waveguide 44 and waveguide 48 of the third transmitting laser 46. A portion of the optical beam from the third transmitting laser 46 is also deflected by +2 gigahertz by SAW 50 and guided by curved waveguide 52 to injection-lock a fourth transmitting laser (TL4) 54, positioned just above the third transmitting laser 46, as a result of the coupling between the curved waveguide 52 and waveguide 56 of the fourth transmitting laser 54. A portion of the optical beam from the fourth transmitting laser 54 is also deflected by +2 gigahertz by a SAW 58 and guided by curved waveguide 60 to injection-lock the frequency of a fifth transmitting laser (TL5) 62 positioned just above the fourth transmitting laser 54. Again, the injection-locking is accomplished as a result of the coupling between the curved waveguide 60 and waveguide 64 of the fifth transmitting laser 62. A portion of the fifth transmitting laser 62 is also deflected by +2 gigahertz by a SAW 66 and guided by a curved waveguide 68 to a sixth transmitting laser (TL6) 70 which is positioned just above the fifth transmitting laser 62. The sixth transmitting laser 70 is injection-locked to the frequency up-shifted optical beam in curved waveguide 68 as a result of the coupling between the curved waveguide 68 and waveguide 72 of the sixth transmitting laser 70.

Similarly, the second transmitting laser (TL2) has its output beam phase-locked to a frequency downshifted −2 gigahertz from the frequency of the master laser 40 as a result of SAW 76. The shifted optical output from the master laser 40 is guided by curved waveguide 78 to injection-lock the second transmitting laser (TL2) 74 to the down-shifted frequency as a result of the coupling between the curved waveguide 78 and waveguide 80 of the second transmitting laser 74. Finally, a portion of the output of the second transmitting laser 74 is frequency down-shifted by −2 gigahertz by SAW 82 and guided to a first transmitting laser (TL1) 84 by curved waveguide 86. The phase-shifted portion of the second transmitting laser 74 injection-locks the first transmitting laser 84 to the down-shifted frequency due to the coupling between the curved waveguide 86 and waveguide 88 of the first transmitting laser 84.

The transmitting lasers are distributed feedback lasers which may be injection-locked to the frequency of the shifted optical beam. The optical beam is coupled between waveguides and reflected by gratings provided in conjunction with the transmitting lasers.

Thus, the optical carriers −4 GHz, −2 GHz, +2 GHz, +4 GHz, +6 GHz and +8 GHz are generated from the reference beam (fr) indicated as 0 GHz in FIG. 2. However, this is equivalent to assuming that the actual reference frequency ($fr^1$) being used is 5 GHz, by up-shifting and downshifting portions of the reference we generate the optical carriers 1, 3, 7, 9, 11 and 13 gigahertz as seen in FIG. 1. These optical carrier outputs from the transmitting lasers TL1, TL2 and TL3 through TL6 are combined to form a multiplexed optical output by, e.g., a star coupler 90. The star coupler 90 includes a plurality of straight and curved waveguide portions which are aligned with and funnel the outputs of the transmitting lasers (TL1-TL6) to a trunk portion 91 where the straight and curved waveguide portions join to provide a single output beam for coupling to a single-mode optical fiber 102, see FIGS. 3 and 5. Advantageously, the output from the star coupler 90 is first amplified by an optical amplifier 92, which may be part of the integrated circuit 36, prior to coupling to the single-mode optical fiber 102.

It is normally difficult to optically separate optical carriers spaced very close together. However, since they are coherent relative to one another, they can be readily heterodyne detected using a single optical local oscillator. The optical heterodyne detection will provide a first broadband intermediate frequency in the microwave region. Thereafter, an electronic heterodyne detection using adjustable coupling capacitors, microwave local oscillators and intermediate frequency filters can then be used to electronically separate the frequencies corresponding to the optical channels.

Figures 3, 4:
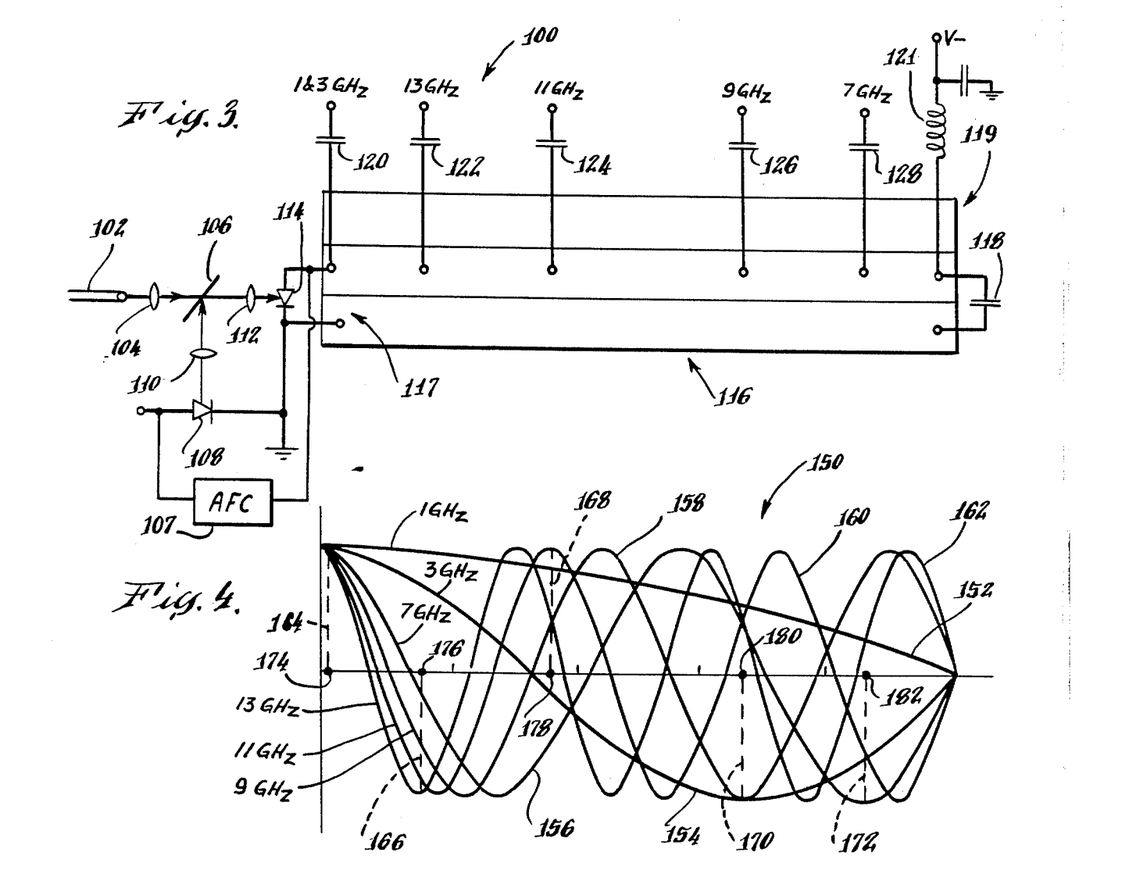
FIG. 3 is a top plan view in partial schematic of an FMD receiver in accordance with the present invention.
FIG. 4 is a graph illustrating the standing wave patterns for the different channel frequencies assignments in FIG. 1.

Referring to FIG. 3, a receiver for optical heterodyne detection and first broadband microwave production is generally illustrated as 100. The output from a single-mode optical fiber 102 is focused by a first lens 104 and applied to a beam splitter 106. An optical local oscillator 108 is tuned to track the first optical carrier 14 in FIG. 1. The output of the optical local oscillator 108 is focused by a lens 110 and applied to the beam splitter 106. The output from the beam splitter 106 is directed to a focusing lens 112 which focuses the optical beam from the beam splitter 106 on a photo-detector or photo-diode 114. For the example illustrated in FIG. 1, the local oscillator 108 will be set 1 gigahertz below the first carrier as indicated at 12 in FIG. 1. Automatic frequency control 107 is then used in conjunction with the local oscillator 108 to provide the frequency tracking by controlling temperature or injection current or both. Since the other optical carriers are coherent with the first optical carrier 14, the beat frequencies for all the optical carriers form an orderly spectrum from 1 to 13 GHz, including 6 frequency channels at 1, 3, 7, 9, 11 and 13 gigahertz. Thus the resulting broadband first intermediate frequency will include 6 relatively narrow frequency channels designated as 14, 16, 22, 24, 26 and 28 in FIG. 1.

A low loss resonant strip line or transmission line 116 is used as the load for the photo-detector 114 which is coupled to one end 117. Since a high driving point impedance is desirable, an odd number quarter wave resonant strip line 116 is employed. If the resonant strip line 116 is a quarter wave for 1 GHz, it will also be odd quarter waves for the higher odd numbered frequencies 3, 7, 9, 11 and 13 GHz. The total length of the resonant strip line 116 in the example given is approximately , 50 millimeters. A termination or shorting capacitor 118 is coupled to the end 119 of the resonant strip line 116 opposite the photo-detector 114. A trimming inductor 121 is also coupled to the end 119 of the resonant strip line 116. Adjustable coupling capacitors 120, 122, 124, 126 and 128 are positioned along the resonant strip line 116 at the proper location to couple out the respective optical channel frequencies as indicated in FIG. 3.

Referring to FIG. 4, the standing wave patterns for the various optical carrier frequencies are illustrated in the graph designated as 150. The standing wave pattern for the 1 GHz carrier frequency is designated 152; the standing wave pattern for the 3 GHz carrier frequency is designated 154; the standing wave pattern for the 7 GHz carrier frequency is designated 156; the standing wave pattern for the 9 GHz carrier frequency is designated 158; the standing wave pattern for the 11 GHz carrier frequency is designated 160; and the standing wave pattern for the 13 GHz carrier frequency is designated 162. Many of the nodes which correspond to the maximum amplitude of these standing waves are connected to the coupling capacitors 120 through 128 in FIG. 3. The dashed lines indicating the node position at which the coupling connections are made for the respective standing wave for the 1 and 3 GHz, 13 GHz, 11 GHz, 9 GHz and 7 GHz carrier frequencies, which are designated as 164, 166, 168, 170 and 172, respectively. These different carrier frequencies are selectively coupled out at the nodes 174, 176, 178, 180 and 182 where the amplitude of the respective standing wave is at a maximum. The separated or decoupled carrier frequencies can be further second heterodyne detected electronically and amplified as desired.

The coupling capacitors 120–128 for each frequency are adjusted so that the resonant strip line 116 is properly loaded at the different frequencies and the Q for each frequency is close to its optimum for selectivity and information bandwidth. Advantageously, using a transmission line or resonant strip line 116 as the load for the photo-diode 114 enables the capacitance of the photo-diode 114 to be neutralized by inductance trimming or by adjusting the length of the resonant strip line 116 or both.

Figure 5:
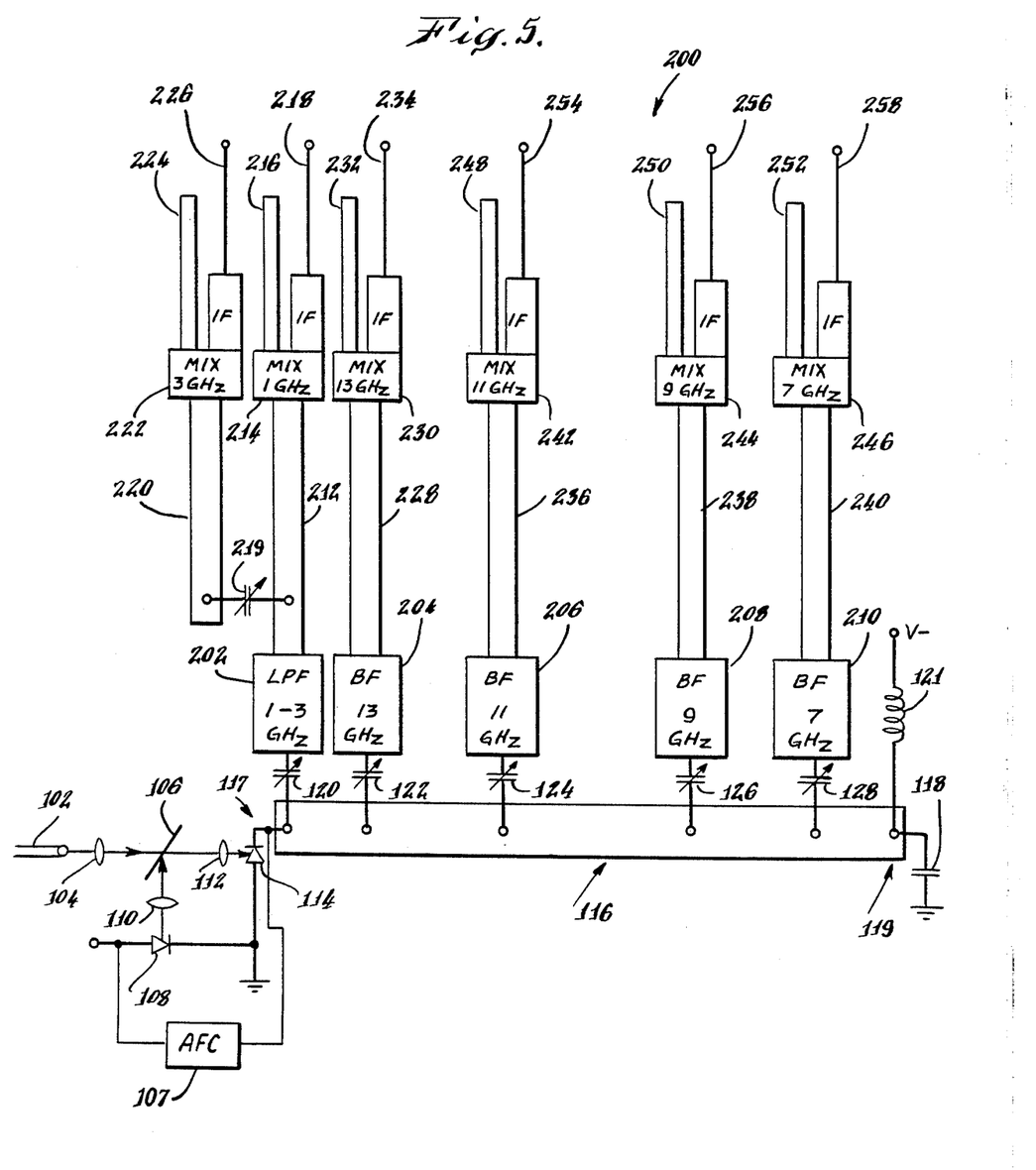
FIG. 5 is a more detailed schematic diagram of an FDM receiver in accordance with the present invention.

Referring to FIG. 5, a more detailed schematic of the optical and electronic heterodyne receiver is illustrated generally as 200; like numbered elements from FIG. 3 are given the same numerical designation in FIG. 5. The six optical carrier frequencies or channels present in the transmission or resonant strip line 116 are coupled out using a low pass filter 202 for the 1 and 3 GHz channels and band pass filters 204, 206 and 208 and 210 for the 13 GHz, 11 GHz, 9 GHz and 7 GHz channels, respectively.

The low pass filter 202 is coupled to resonant strip line 212 and to a 1 GHz microwave receiver (front end) 214 which receives its local oscillator input from another strip line 216. An appropriate IF output is obtained from output line 218. The strip line 212 is coupled by an adjustable capacitor to another resonant strip line 220 which is coupled to a 3 GHz microwave receiver 222 which receives its local oscillator input along strip line 224. The IF (normally the same as the 1 GHz channel) output is obtained from output line 226.

The band pass filter 204 is coupled to a resonant strip line 228 which is electrically coupled at its opposite end to a microwave receiver 230 for 13 GHz. The microwave receiver 230 receives its local oscillator input from strip line 232 and provides an IF output on output line 234. Likewise band pass filters 206, 208 and 210 are coupled to resonant lines 236, 238, 240, respectively, which are electrically coupled to microwave receivers 242, 244 and 246, respectively, which are tuned to 11 GHz, 9 GHz and 7 GHz, respectively. The microwave receivers 242, 244 and 246 receive their local oscillator inputs on strip lines 248, 250 and 252, respectively, and provide IF outputs on output lines 254, 256 and 258, respectively.

In implementing the system of the present invention, a reference optical wave, e.g., as shown in FIG. 1 at 30, is utilized to generate a plurality of optical carriers which are coherently related to the frequency of the reference optical wave and therefore to one another. The optical carriers are all allowed to drift, but the relative coherence between the optical carriers and the reference optical wave must remain stable within required tolerances. In accordance with the embodiment in FIG. 2, a reference optical wave from a laser diode 40 is up and down-shifted by a plurality of SAWs to provide a plurality of optical carrier waves having fixed or stable frequencies relative to the reference optical wave. This may be accomplished by injection-locking or optical frequency shifting the frequency of the reference optical wave to provide a multiplicity of carrier frequencies. In FIG. 2, injection-locking of a plurality of transmitting lasers TL1 through TL6 is employed and a star coupler 90 is utilized to combine the outputs of the transmitting lasers to form a single multiplexed optical output beam. The output from the star coupler 90 is optically coupled to an optical amplifier 92 to provide any necessary amplification as a result of any loss in the optical carriers as a result of their transmission through and combination by the star coupler 90. The output of the optical amplifier 92 is coupled to a single-mode optical fiber 102 as such shown in FIGS. 3 and 5. The optical carriers may be used for simultaneous digital or analog information transmission, as desired. This may be accomplished by applying digital or analog information to a specific optical carrier frequency.

As shown in FIGS. 3 and 5, the multiplexed optical output from the single-mode fiber 102 is optically heterodyne detected with the local oscillator 108 tuned to track the reference frequency by combining the output from the optical fiber 102 and local oscillator 108 at the beam splitter 106 and directing the same to the photo-detector 114 which is coupled to the quarter wave resonant strip line 116 to provide a microwave spectrum. The resonant strip line 116 is constructed to facilitate coupling out the assigned optical carrier frequencies. As shown in FIG. 1, the assigned optical carrier frequencies, for example, are 1, 3, 7, 9, 11, 13 GHz and represent the two frequency bands 18 and 20. The different optically heterodyne detected frequencies are coupled out at the nodes 174–182 along the strip line 116 where the amplitude of the resulting standing waves is at a maximum, see the interrelationship between FIGS. 3 and 4.

The channel frequencies may be further second or electronically heterodyne detected and amplified as desired. To accomplish this, as indicated in FIG. 5, a low pass filter 202 and band pass filters 204 through 210 are utilized in conjunction with additional strip lines 212, 220, 228 and 236–240 and receivers (front end) 222, 214, 230 and 242–246 to provide the desired IF frequency outputs on lines 218, 226, 234, 254, 256, and 258. For example, the possible frequencies for the receivers from inputs 224, 216, 232, 248, 250 and 252 shown in FIG. 5, for a second intermediate frequency of 2.5 GHz, would be 3.5 and 5.5 GHz for the 1 and 3 GHz frequency channels, 4.5 and 6.5 GHz for the 7 and 9 GHz channels and 13.5 and 15.5 GHz for the 11 and 13 GHz channels.

Advantageously, the wavelength of the frequency separation for the optical carriers of the present invention is only a small fraction of a nanometer. Therefore, with such small wavelength separations the present invention is compatible with conventional WDM systems.

It should be understood by those skilled in the art that various modifications may be made in the present invention to provide closely spaced coherent optical carriers by utilizing injection-locked single-mode laser diodes and acousto-optical modulators as well as by using other techniques in which the frequencies between the lasers can be stabilized without actually frequency or phase-locking the same; such systems are considered to be within the scope and spirit of the present invention as described in the specification and defined in the appended claims.

What is claimed is:

1. A method of providing increased information carrying capacity in optical fiber communication through frequency-division-multiplexing, comprising the steps of:

generating a reference optical beam;
generating a plurality of closely spaced optical carriers having frequencies which are coherently related to the reference frequency of the reference optical beam and which are capable of tracking the reference frequency and maintaining coherence therewith;
combining the plurality of closely spaced optical carriers to provide a multiplexed optical output beam;
generating a local optical beam capable of tracking the reference optical beam;
optical heterodyne detecting the plurality of optical carriers of the multiplexed optical output beam simultaneously with the tracking local optical beam to convert the plurality of optical carriers of the multiplexed optical output beam into a corresponding microwave spectrum;
tuning an optical local oscillator to track the first optical carrier of the plurality of closely spaced optical carriers;
generating a broadband first intermediate frequency as a result of the optical heterodyne detection;
providing a spectrum of the beat frequencies of the optical carriers;
assigning the frequencies of the plurality of closely spaced optical carriers to minimize harmonic distortion during optical hetgerodyne detection;
electronically separating information channels in the microwave spectrum corresponding to the frequencies of the closely spaced optical carriers;
selectively coupling out the beat frequencies; and
providing a second heterodyne detection to separate the individual frequencies of the plurality of closely spaced optical carriers from the broadband intermediate frequency.

2. The method recited in claim 1, including the step of:

optically amplifying the multiplexed optical output beam.

3. The method recited in claim 1, including the steps of:

providing an injection laser;
frequency modulating the injection laser near its resonant frequency to produce a plurality of sidebands;
providing a plurality of transmitting lasers; and
selectively injection-locking each of the plurality of transmitting lasers to one of the sidebands of the injection laser to provide a plurality of closely spaced optical carriers having predetermined separation frequencies.

4. The method recited in claim 1, wherein:

the plurality of closely spaced optical carriers are generated from the reference optical beam.

5. The method recited in claim 4, including the steps of:

providing a reference laser beam for the reference optical beam;
frequency shifting at least a portion of the reference laser beam;
providing a transmitting laser; and
frequency stabilizing the transmitting laser with the frequency shifted portion of the reference laser beam to maintain a finite frequency difference between the stabilized transmitting laser output and the reference laser beam.

6. The method recited in claim 5, including the steps of:

providing a plurality of transmitting lasers; and
frequency stabilizing the plurality of transmitting lasers with the reference laser beam, each of the transmitting lasers being stabilized with a frequency shifted portion of the reference laser beam while maintaining a finite frequency difference with respect to the reference laser beam.

7. A frequency-division-multiplexing system for increasing the information carrying capacity in optical fiber communication, comprising:
means for generating a reference optical beam;
means for generating a plurality of closely spaced optical carriers having frequencies which are coherently related to the reference frequency of the reference optical beam and which are capable of drifting with the reference frequency while maintaining coherence therewith;
optical waveguide means for combining the closely spaced optical carriers to provide a multiplexed optical output beam;
means for down-shifting the frequency of a portion of the reference optical beam to produce at least one lower frequency band;
means for up-shifting the frequency of a portion of the reference optical beam to produce at least one upper frequency band;
a plurality of transmitting lasers;
means for injection-locking said transmitting lasers to the up-shifted and down-shifted frequencies; and
said outputs of said transmitting lasers being combined by said optical waveguide means.

8. The frequency-division-multiplexing system recited in claim 7, including:
means for optically amplifying the multiplexed optical output beam.

9. The frequency-division-multiplexing system recited in claim 7, including:
means for frequency stabilizing said transmitting laser with the frequency shifted portion of the reference optical beam to maintain a finite frequency difference between the stabilized transmitting laser output and the reference optical beam.

10. The frequency-division-multiplexing system recited in claim 7, wherein:
said means for generating a plurality of closely spaced optical carriers provides optical carriers having frequencies which minimize harmonic distortion during heterodyne detection.

11. The frequency-division-multiplexing system recited in claim 7, wherein:
said optical heterodyne detection means generate a broadband intermediate frequency; and
said means for electronic separation includes heterodyne detection means for separating the optical carrier frequencies present in the broadband intermediate frequency which correspond to the frequencies of the closely spaced optical carriers.

12. The frequency-division-multiplexing system recited in claim 7, wherein:
said means for generating a plurality of closely spaced optical carriers maintains a frequency separation between the optical carriers on the order of a fraction of a nanometer.

13. The frequency-division-multiplexing system recited in claim 7, wherein:
said reference optical beam generating means, said optical carrier generating means and said optical waveguide means are formed as an integrated circuit.

14. The frequency-division-multiplexing system recited in claim 7, including:
means for optically heterodyne detecting the plurality of optical carriers of the multiplexed optical output beam, including means for generating a tracking optical beam capable of tracking the reference optical beam to convert the plurality of optical carriers of the multiplexed optical output beam into a corresponding microwave spectrum; and
means for electronically separating the optical carrier frequencies present in the microwave spectrum which correspond to the frequencies of the closely spaced optical carriers.

15. The frequency-division-multiplexing system recited in claim 14, wherein:
said means for optically heterodyne detecting simultaneously detects the plurality of closely spaced optical carriers.

16. A frequency-division-multiplexing system for increasing the information carrying capacity in optical fiber communication, comprising:
means for generating a reference optical beam;
means for generating a plurality of closely spaced optical carriers having frequencies which are coherently related to the reference frequency of the reference optical beam and which are capable of drifting with the reference frequency while maintaining coherence therewith;
optical waveguide means for combining the closely spaced optical carriers to provide a multiplexed optical output beam;
means for optically heterodyne detecting the plurality of optical carriers of the multiplexed optical output beam, including means for generating a tracking optical beam capable of tracking the reference optical beam to convert the plurality of optical carriers of the multiplexed output beam into a corresponding microwave spectrum; and
means for electronically separating the optical carrier frequencies present in the microwave spectrum which correspond to the frequencies of the closely spaced optical carriers;
said optical tracking optical beam generating means includes a local oscillator;
said heterodyne detection means includes photodetector means and a resonant transmission line;
said means for electronic separation includes coupling capacitors and filters coupled to said resonant transmission line to selectively remove the frequencies corresponding to the frequencies of the plurality of closely spaced optical carriers.

17. A frequency-division-multiplexing system for increasing the information carrying capacity in optical fiber communication, comprising:
reference laser means for producing a reference optical beam;
a plurality of transmitting laser means;
optical waveguide means intercoupling said reference and transmitting laser means;
surface acoustic wave transducer means for shifting the frequency of at least a portion of the reference optical beam so that said optical waveguide means intercouples said portion of the reference optical beam to said transmitting laser means and the outputs of said transmitting laser means become phase locked relative to the reference optical beam whereby the plurality of transmitting laser means provide a plurality of closely spaced optical carriers having frequencies which are coherently related to the frequency of the reference optical beam and are capable of drifting with the reference frequency while maintaining coherence therewith; and optical waveguide means for combining the closely spaced optical carriers to provide a multiplexed optical output beam.

18. A frequency-division-multiplexing system as recited in claim 17, additionally comprising:

means for optionally amplifying the multiplexed optical output beam;

means for optically heterodyne detecting the plurality of optical carriers of the multiplexed output beam simultaneously, including means for generating a tracking optical beam capable of tracking the reference optical beam to convert the plurality of optical carriers of the multiplexed optical output beam into a corresponding microwave spectrum in the form of a broadband intermediate frequency; and means for electronic channel separation of the optical carrier frequencies present in the broadband intermediate frequency which correspond to the frequencies of the closely spaced optical carriers.

19. A frequency-division-multiplexing system for increasing the information carrying capacity in optical fiber communication, comprising:

means for generating a reference optical beam;

means for generating a plurality of closely spaced optical carriers having frequencies which are coherently related to the reference frequency of the reference optical beam and which are capable of drifting with the reference frequency while maintaining coherence therewith;

optical waveguide means for combining the closely spaced optical carriers to provide a multiplexed optical output beam;

a local oscillator for generating a tracking optical beam capable of tracking the reference optical beam;

means responsive to the tracking optical beam for optically heterodyne detecting the plurality of optical carriers of the multiplexed optical output beam;

photo detector means responsive to the optically heterodyne detected optical carriers for providing a corresponding microwave spectrum;

a resonant transmission line connected to said photo detector means for receiving said microwave spectrum;

coupling capacitors and filters coupled to said resonant transmission line to selectively remove signals having the frequencies of said microwave spectrum corresponding to the frequencies of the plurality of closely spaced optical carriers;

a plurality of secondary resonant transmission lines electrically coupled to said filters;

a plurality of electronic heterodyne receivers connected to said transmission lines; and a plurality of local oscillators for providing input to said receivers, whereby signals carried on said optical carriers are obtained.

20. A method providing increased information carrying capacity in optical fiber communication through frequency-division-multiplexing comprising the steps of:

generating a reference optical beam;

generating a plurality of closely spaced optical carriers having frequencies which are coherently related to the reference frequency of the reference optical beam and which are capable of drifting with the reference frequency while maintaining coherence therewith;

combining the plurality of closely spaced optical carriers to provide a multiplexed optical output beam;

generating a tracking optical beam for tracking the reference optical beam;

optically heterodyne detecting the plurality of optical carriers of the multiplexed optical output beam using said tracking optical beam to convert the plurality of optical carriers of the multiplexed optical beam into a corresponding microwave spectrum;

providing said microwave spectrum to a resonant transmission line;

selectively removing from the resonant transmission line signals having the frequencies of the microwave spectrum corresponding to the plurality of closely spaced optical carriers;

providing said removed signals to second resonant transmission lines; and heterodyne detecting the removed signals to obtain channel signals.

* * * * *